July 14, 1942.   C. MEYER   2,289,796
APPARATUS FOR CONTROLLING THE FLOW OF GOODS
Filed June 20, 1940   6 Sheets-Sheet 1

Fig.1.

INVENTOR
Charles Meyer
BY

ATTORNEY

July 14, 1942. C. MEYER 2,289,796
APPARATUS FOR CONTROLLING THE FLOW OF GOODS
Filed June 20, 1940 6 Sheets-Sheet 2

INVENTOR
Charles Meyer
BY
ATTORNEY

July 14, 1942.  C. MEYER  2,289,796
APPARATUS FOR CONTROLLING THE FLOW OF GOODS
Filed June 20, 1940  6 Sheets-Sheet 6

INVENTOR
Charles Meyer
BY
ATTORNEY

Patented July 14, 1942

2,289,796

UNITED STATES PATENT OFFICE 2,289,796

APPARATUS FOR CONTROLLING THE FLOW OF GOODS

Charles Meyer, Yonkers, N. Y., assignor to Bartmann & Bixer Inc., New York, N. Y., a corporation of New York Application June 20, 1940, Serial No. 341,503

12 Claims. (Cl. 112—2)

This invention relates to a method and apparatus for controlling the flow of a continuous length of pliable material, particularly although not necessarily in preparation for a manufacturing operation, such as the hemming of curtain material.

It is within the contemplation of my invention to effectuate a lateral stretching or tensioning of the goods without interrupting the flow or longitudinal movement thereof. And in this aspect of my invention it is an object to readily enable the said tensioning or stretching effect to be varied in magnitude, or entirely eliminated, or to produce a crowding effect of the material towards the medial portion thereof should that be necessary.

It is also an important object of my invention to automatically guide or effect a tracking of one or both of the lateral edges of the moving material along a predetermined path, so that such tracked edges could be directed along a straight line so as to cause them to pass predetermined points at which manufacturing steps can be performed thereon. Heretofore whenever it was desired to track an edge of moving material, such as a continuous length of pliable cloth, it was necessary to employ one of several rather cumbersome procedures, one method involving the carrying of the material over a roller and producing a lateral shifting of the entire roller. Another method has been to place the material in careful flat folds upon a platform, the edge of the material to be tracked being carefully arranged as closely as possible in one vertical plane, and then moving the entire platform laterally to make any necessary correction. It is within the contemplation of my invention to simplify the means of tracking a length of moving material by eliminating the necessity of any shifting of the entire roller or platform, and enabling a straight-line tracking to be effected by simple photo-electric means, regardless of the disordered condition of the material on the platform from which the travel of the material begins.

It is a further important object of my invention to provide photo-electric tracking means where, although the light source and the light-sensitive means are on opposite sides of the material, the photo-electric relay will not be actuated even if the material is very sheer or contains many relatively large interstices. More specifically, it is an objective of this invention to permit even curtain or lace material to operatively interrupt the beam of light between the light source and the light-sensitive means.

Another very important object of my invention is to enable the aforesaid tracking and tensioning or stretching operations to be performed simultaneously, so that neither operation affects the other.

It is a further object of my invention to enable a stretchable and pliable material, such as curtain cloth, to be fed into a hemming apparatus, whereby the edge to be hemmed is automatically guided to hem-folding devices adapted to perform two or three folding operations, and thence to a hemstitching machine, all without the help of manual adjustments. The method heretofore followed has been to manually guide the cloth into a selvage cutting machine, and thereafter to carefully guide the cut edge through hem folders and a sewing machine, the operator being required to feed the free side of the cloth across the sewing table manually as fast as the machine does its work. Thereafter the cloth falls into a rumpled heap. The manual cutting of the selvage generally results in an uneven edge, requiring considerable skill and caution in the guiding of the material through the hem-folding and sewing devices. This causes considerable delay, resulting in a relatively high cost for the production of hems; and furthermore, the manual operation almost always results in uneven hemmed edges. It is hence one of the objects of this invention to eliminate the manual or human element above-referred-to, and effectuate automatically the hemming operation along a perfectly cut edge, and with a hem of uniform size.

It is also an object of this invention to enable hems of various sizes to be automatically produced by a simple adjusting operation.

A further object of this invention is to provide suitable simple means of cutting a selvage at the edge of a curtain and suitably disposing of same.

It is also within the contemplation of my invention to so guide and direct the material as to enable it to automatically fall in an orderly and well-arranged manner into a suitable receptacle, after the manufacturing operations on the material had been performed.

Another object of my invention is to enable an apparatus of the above-mentioned category, particularly of the type adapted to perform manufacturing operations on a continuous length of pliable material, to be automatically stopped so as not to cause damage to the material. And in this aspect of my invention it is the further object to provide a cut-off device, such as a treadle, which is firmly and securely held in a depressed or other operative position while the apparatus is functioning, but which can be released by a mechanical or electrical impulse of small magnitude.

Other objects, features and advantages will appear from the drawings and the description hereinafter given.

Referring to the drawings.

Figure 6:
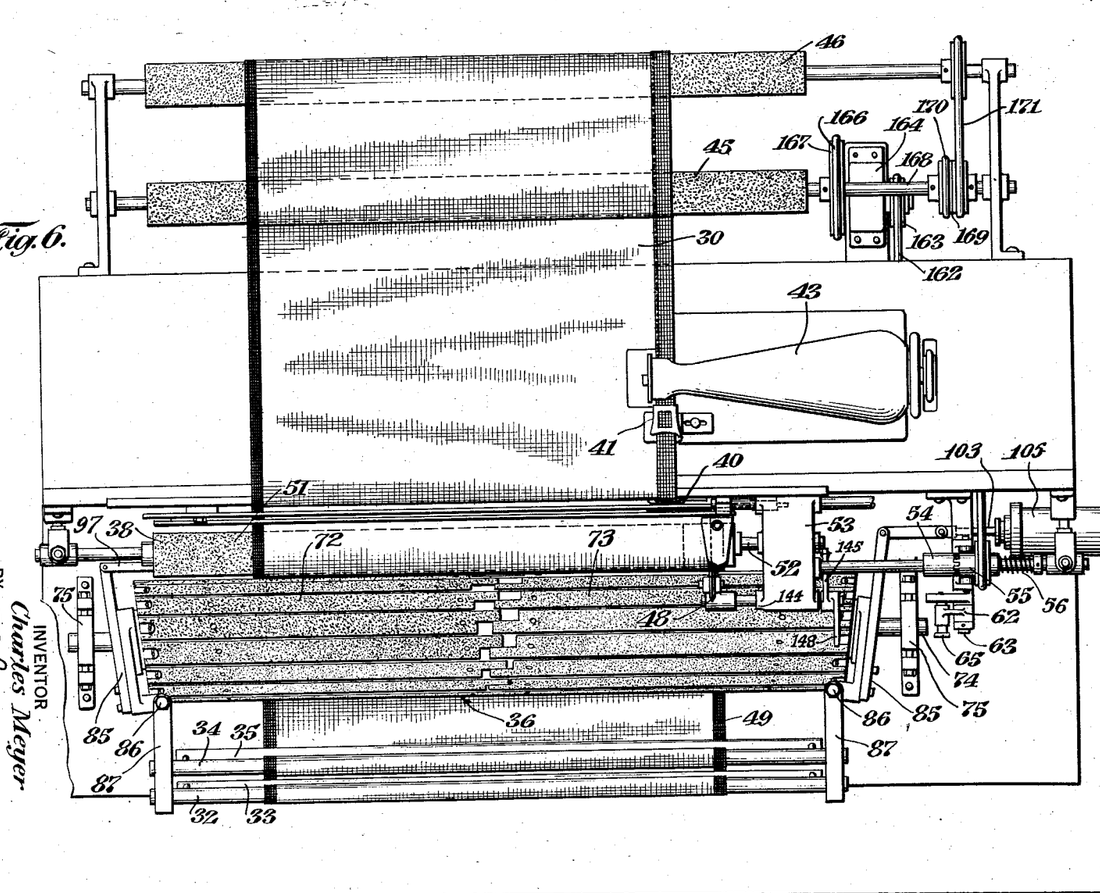
Figure 6 is a plan view of the apparatus of Figure 1.
Figures 13, 15:
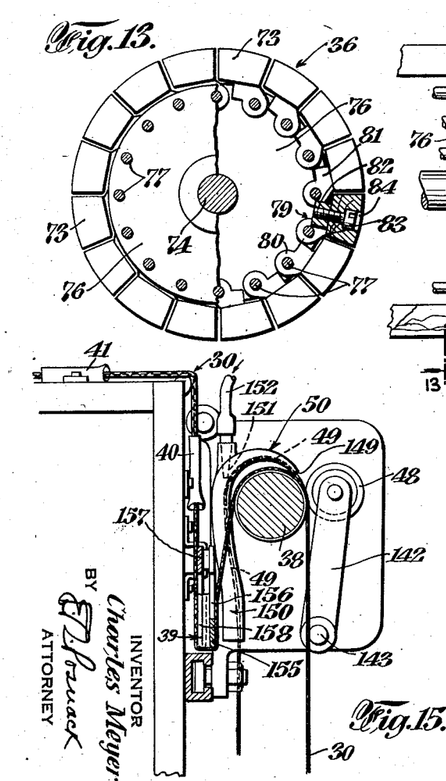
Figure 13 is a section of the control drum taken substantially along line 13—13 of Figure 12, part of the section being taken through a fastening screw connecting a slide member and a slat on the drum.
Figure 15 is an enlarged side sectional view of Figure 2 taken substantially along line 15—15 of Figure 1, showing the arrangement of selvage and hem-folding units.

The path of the material 30, as illustrated in the drawings, extends upwardly from container 31 (Figure 3), around and in slidable engagement with the parallel tensioning bars 32, 33, 34 and 35, and thence around the underside and rear of the control drum 36 with which it is preferably, although not necessarily, in contact along one-quarter of its periphery. The material then passes upwardly through the photo-electric device 37, over the roller 38, down to the first hem-folding unit 39, up again to the second and third hem-folders 40 and 41, respectively, underneath the presser foot 42 of the sewing machine 43, from where the material is pulled around rollers 44, 45 and 46, and thence vertically down to receptacle 47. It should also be noted that after passing the photo-electric device 37, the material is engaged by a cutter 48 bearing against the roller 38, as clearly shown in Figures 1, 6 and 15. This cutter removes the selvage or marginal portion 49 of the material, a pneumatic suction device 50 drawing in the severed portion and directing it out of the path of the material, all in a manner hereinafter to be more fully explained.

Figure 1:
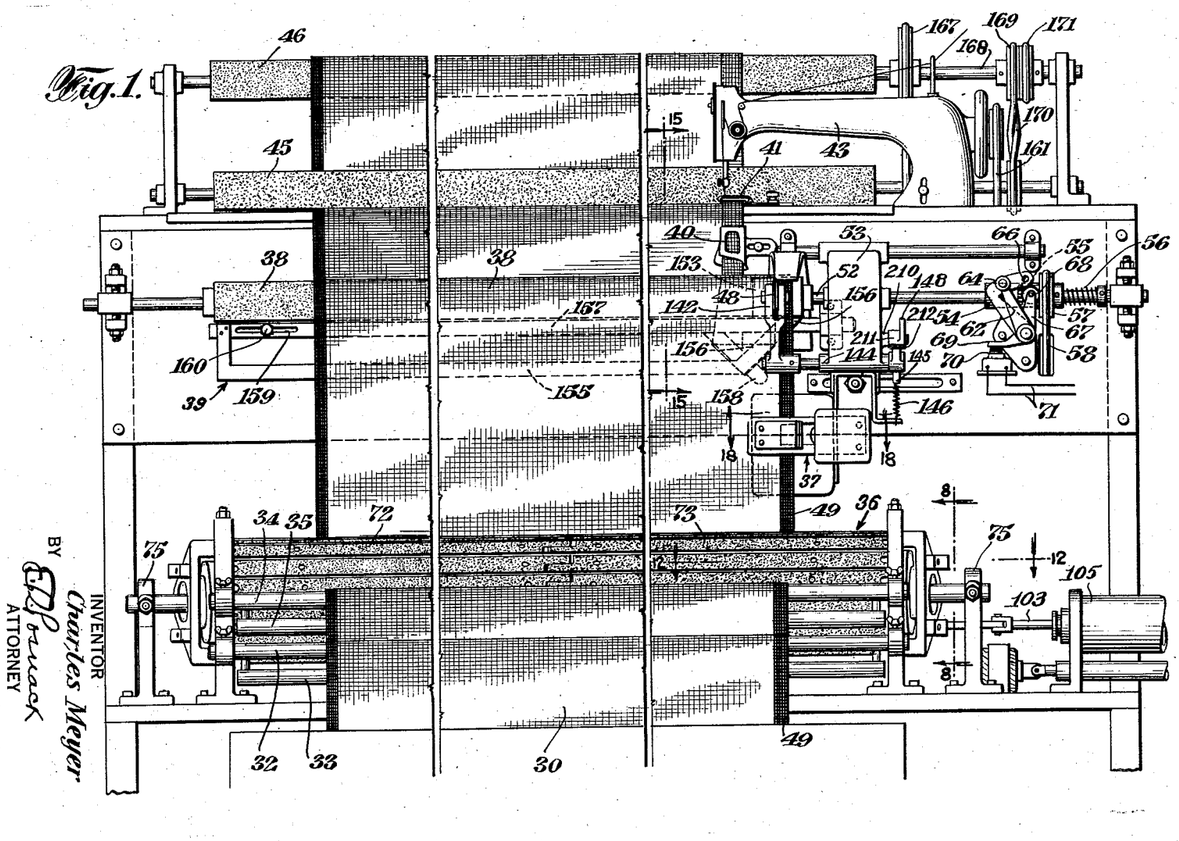
Figure 1 is a front view of my invention as employed in conjunction with an apparatus for forming hems on a continuous sheet of curtain material.
Figures 2, 4:
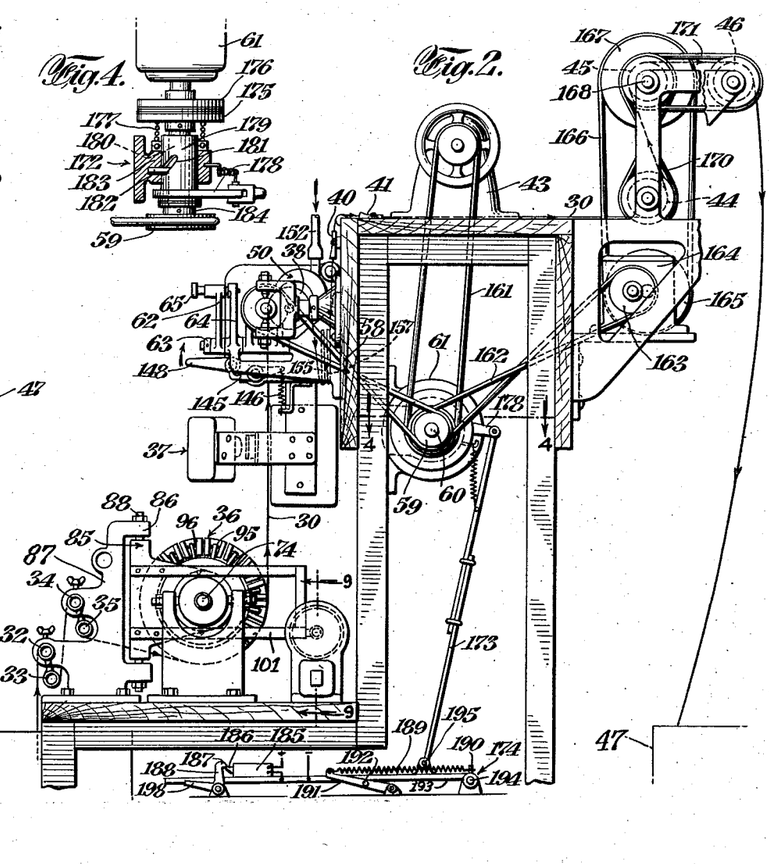
Figure 2 is a side elevation of the invention of Figure 1 shown partly in section.
Figure 4 is a partial section of Figure 2 taken substantially along line 4—4, showing the clutch arrangement associated with the driving mechanism and the cut-off treadle.

In the form of my invention illustrated, the roller 38 is the actuating member which pulls the material 30 upwardly, although this invention is not limited to this specific arrangement, inasmuch as other elements with which the material comes in contact may constitute the mechanism for operatively moving it through the apparatus. Actuating roller 38 is provided with a friction surfacing 51, such as emery cloth, so as to effectuate a secure grip upon the material. Said roller 38 is mounted upon shaft 52 which extends into gear box 53, and by suitable geared mechanism of a conventional nature and not herein shown is connected to the toothed clutch element 54 engageable with the coacting clutch element 55—said clutch elements being held yieldably in engagement by the spring 56 in conventional manner. Operatively associated with clutch element 55 is the pulley 57 which is connected by belt 58 with pulley 59 (Figure 2) on shaft 60 associated with the motor 61. The clutch parts as shown in Figure 1 are in engagement, but can be disengaged by an operative manipulation of lever 62 pivotally mounted at 63 of frame 64. The lever 62 contains a retractable pin mechanism 65 adapted to be inserted within two holes 66 in said frame, Figures 1 and 2 showing the pin operatively inserted in one of the holes. The said lever 62 has fixedly associated therewith another lever 67 containing a terminal portion 68 abuttable with pulley 57. Upon a clockwise rotation of lever 62, it is apparent that the said terminal portion 68 will force said pulley 57 and the clutch element 55 outwardly against the action of spring 56, to disengage the clutch. It is thus apparent that the actuating roller 38 can accordingly be disconnected by an operative movement of lever 62.

It also will be observed that in fixed relation with lever 62 is a contact lever 69 which is in engagement with contact 70 when the clutch is engaged; and upon a disengagement of the clutch, as aforesaid, the contact lever 69 will be rotatably lifted in a clockwise direction, to break contact at 70. The circuit through the leads 71 is operatively closed when contact is made at 70; and when such contact is broken, the circuit is opened and the current through lead 71 is cut off. Such leads are a portion of the circuit operatively associated with driving mechanism for roller 38 or other parts of the apparatus, the electrical connection not being shown here in detail inasmuch as it is of a conventional nature and is obvious to anyone skilled in the art.

As the material moves upwardly under the influence of said roller 38, it comes in contact with the control drum 36 as aforesaid, which drum is accordingly rotatably actuated by said material. This drum contains two groups of slats disposed about the periphery of the drum and in parallel relation to its axis, the slats 72 in the group on the left side of the drum having their inner ends in adjustable interlocking engagement with the corresponding ends of the slats 73 on the right side of the drum. The said slats are preferably covered with a friction surfacing, such as emery cloth, so as to provide a secure frictional grip between the material and the slats. The internal portion of the control drum 36 contains a shaft 74 mounted at bearings 75, said shaft having fixedly mounted thereupon at intervals the disclike supports 76. Extending through the said supports along a circular portion thereof adjacent the aforesaid slats 72 and 73 are a plurality of spaced rods 77 disposed in parallel relation to shaft 74, these rods being shown secured in place by nuts 78. The arrangement of supports 76 and rods 77 constitutes an internal cylindrical squirrel cage over which are disposed the aforesaid slats in a manner to be now described.

Slidably movable over said rods 77 are the slide members 79 each comprising two oppositely disposed lugs 80 joined by a longitudinal connecting portion 81, each of the lugs containing a hole therein for slidably accommodating one of said rods 77. The arrangement is such that each slide member 79 is in slidable engagement with two adjacent rods, each rod extending through oppositely disposed lugs 80 of two adjacent slide members. The said connecting portion 81 of each slide member contains a threaded hole 82; and extending through a corresponding hole in each slat is a screw member 83 the shank of which is in threaded engagement with the walls of hole 82. The head of each screw member 83 is disposed within a depression 84 in the slat, so that no portion of the screw member extends thereabove. The said slide members 79 and screws 84 are arranged in spaced relation longitudinally along the control drum, so that for each rod and slat there are a number of spaced slide members, the particular design illustrated containing four. It is thus apparent that the slats 72 and 73 are held in place about the inner cage by the attachment of screw members 83 to the slide members 79. It is also obvious that the slats 72 and 73 can move in directions parallel to the axis of the drum, the diameter of the drum throughout the length thereof remaining constant and unchanged regardless of the movement of the slats. Regardless of the movement of the slats, the supporting structure of the control drum, embodying the squirrel cage with parts affixed thereto, is capable only of a rotary motion.

Figure 7:
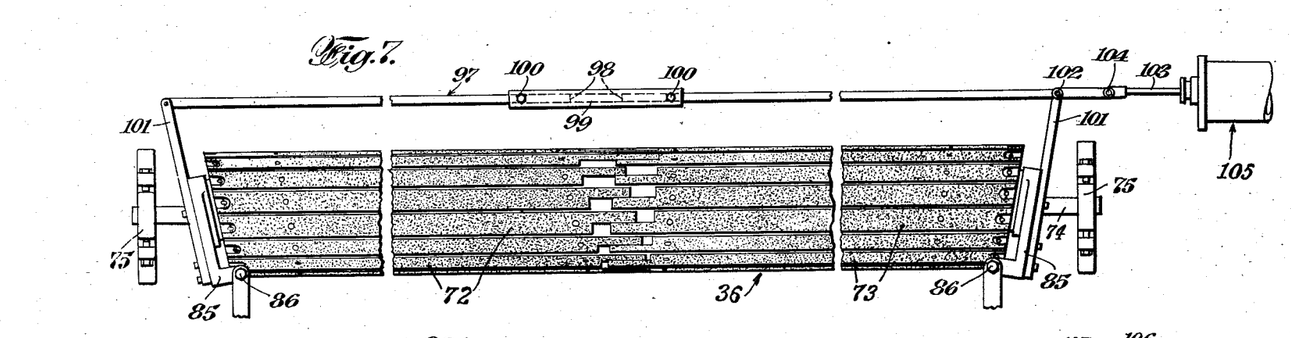
Figure 7 is a plan view of the control drum of my invention for simultaneously spreading or tensioning the material and causing a lateral corrective shifting thereof in accordance with actuating movements from the tracking mechanism associated with my invention.

The movement of the slats on the control drum is effected through the medium of the two cam members 85 pivotally mounted at 86 at opposite ends of the control drum. In the preferred arrangement, each side of the control drum is provided with a framework 87 which supports not only the said rods 32, 33, 34 and 35, but also the vertical shaft 88 upon which the said cam member 85 is mounted. The cam member contains a centrally disposed sleeve 89 with an enlarged central aperture 90 through which the shaft 74 extends, the sleeve containing flange 91 and ring 92 between which the rotatably mounted disk 93 is disposed. The said disk contains a plurality of radially disposed cylindrical apertures 94 into which slidably extend the correspondingly disposed cylindrical plungers 95 pivotally mounted at the outer ends of the slats 72 and 73. More specifically, each slat, in the preferred construction of my invention, contains a bifurcated outer end portion connected by a pin 96 upon which one of said plungers 95 is pivotally and slidably mounted. By an arrangement which will be more specifically hereinafter described, the oppositely disposed cam members 5 are, during the most common condition of operation of my apparatus, angularly disposed with respect to each other, so that those of the plungers 95 that are diametrically opposite the pivotal mountings 86 are farthest removed from each other. When the cam members are in this position, an operative rotation of the control drum 36 will cause a corresponding rotation of disk 93 about the fixed sleeve 89 thereby causing those of the slats 72 and 73 farthest removed from the aforesaid pivotal mountings 86 to be moved outwardly, whereas those of the slats 72 and 73 closest said pivotal mountings have their inner interlocking ends in relatively close relation. In other words, as the control drum rotates, it carries with it the plungers 95, these being guided outwardly by the disk 93 as they move rearwardly away from the said pivotal mountings 86; and as these plungers 95 move outwardly, they carry the corresponding slats 72 and 73 outwardly with them. The resulting arrangement is hence as clearly shown in Figures 6 and 7 where the length of the control drum is shown to be of progressively greater proportions as the distance from the pivotal mountings 86 increases. Inasmuch as the material 30 initially engages the control drum along a line relatively close to the pivotal mountings 86 of the cam member, and leaves that portion of the rear of the control drum furthermost from said mountings, it is apparent that the material during its frictional engagement with the control drum will be stretched or tensioned laterally as it progresses rearwardly and upwardly, thereby eliminating all folds and creases, and properly preparing the material for further manufacturing steps.

The angular positions of the cam members 85 can be controlled by the master rod 97 extending parallel to the axis of the control drum and preferably, although not necessarily, to the rear thereof. Said master rod can be varied in length; and in the form of my invention illustrated, this is accomplished by splitting said rod in the center, inserting over the adjacent ends 98 thereof the tube 99, and frictionally holding said tube in predetermined positions over said control rod 97 through the medium of the set screws 100. Each of the cam members 85 is provided with at least one arm 101 which is pivotally attached at 102 to the said master rod 97. Hence by operatively adjusting the length of rod 97, the relative angular disposition between the cam members 85 can be varied, and the amount of the spreading movement of the slats 72 and 73 can be accordingly varied. Thus, should it be desired to reduce the lateral spreading of the material, or to eliminate the spreading entirely, or in fact even to effectuate a crowding thereof towards the center, the master rod 97 can be correspondingly shortened; and to effect an increase of the spreading or tensioning action of the slats, the rod 97 can be correspondingly increased within permissible limits.

The aforesaid master rod 97 serves another very important function in that it cooperates with certain tracking mechanism forming part of my invention for holding an edge of the material along a straight path. By a certain reciprocating device which will hereinafter be more fully described, rod 97 is caused to oscillate in the direction of its length, under the influence of the tracking mechanism, thereby imparting to the upwardly moving material a corrective action. If, for example, the master rod 97 is moved to the left, it produces a corresponding counter-clockwise rotation of the cam members 85 about their respective mountings 86, thereby causing the material engaging the control drum to shift laterally to the left a corresponding distance—this lateral shifting movement constituting the corrective action, as will hereinafter appear. Likewise, upon a movement of the master rod 97 to the right, a corresponding corrective action will occur in the opposite direction. And it is of extreme importance to note that while these corrective movements are imparted to the slats of the control drum, the total spreading or tensioning action remains unaltered, inasmuch as the length of master rod 97 remains unchanged. In other words, regardless of the magnitude of the corrective movement of the slats on the control drum, the relative outward spreading movements of the two groups of slats continue without change whatsoever, the slats farthest removed from mountings 86 being in their outermost projected positions the same amount regardless of the aforesaid corrective movements, inasmuch as the angular disposition between the two cam members 85 remains unchanged. This arrangement hence enables a corrective action to be continuously imparted to the material without in any way affecting the predetermined spreading, tensioning or crowding effect of the material.

Figures 8, 9, 10, 11:
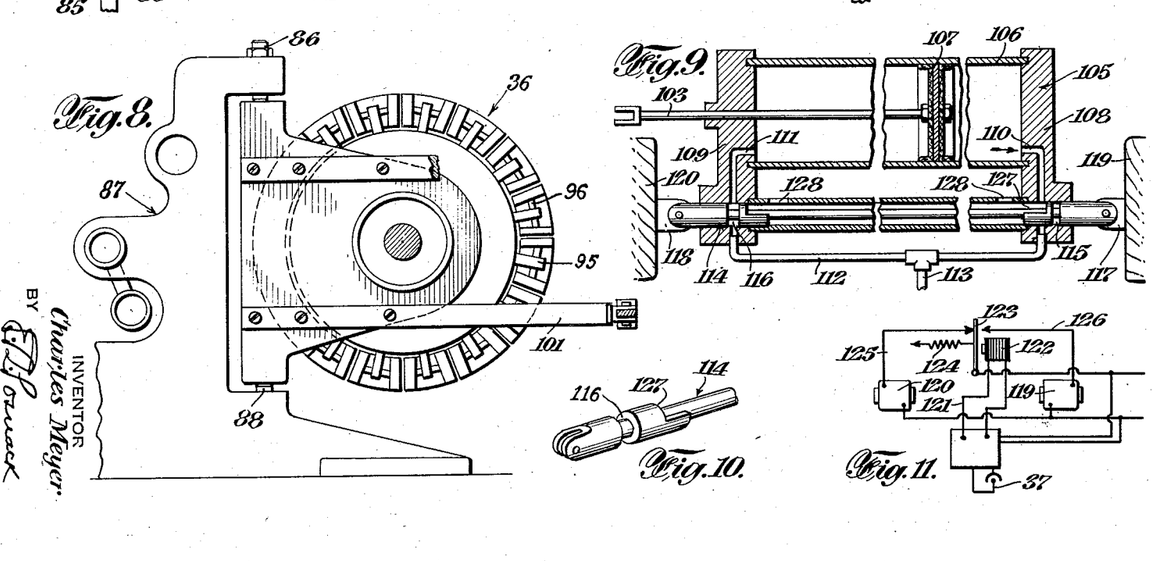
Figure 8 is a fragmentary section of Figure 1 taken along line 8—8, showing an end view of the control drum.
Figure 9 is a vertical section of Figure 2 substantially along line 9—9 thereof, showing a pneumatically operated reciprocating piston operatively associated with the control drum for imparting continuous corrective oscillations thereto.
Figure 10 is a fragmentary perspective of the air valve associated with the structure of Figure 9.
Figure 11 is a wiring diagram of the circuit through the two solenoids and photo-electric cell associated with the structure of Figure 9.
Figure 12:
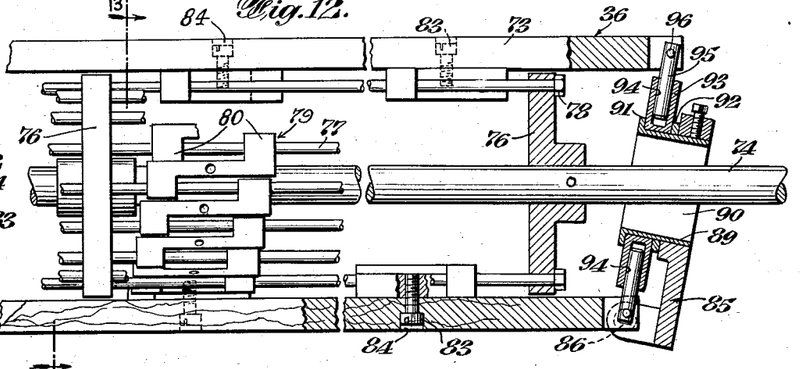
Figure 12 is an enlarged fragmentary sectional plan view of the control drum taken substantially along line 12—12 of Figure 1.

The direct mechanical connection to the master rod 97 for effectuating the aforesaid oscillations thereof is via the piston rod 103 pivotally connected to rod 97 at 104. This piston rod constitutes part of a pneumatically operated reciprocating device 105 containing a cylinder 106 in which the piston 107 attached to piston rod 103 reciprocatingly moves. Extending through the walls 108 and 109 are the air passageways 110 and 111 which communicate through pipe 112 to fitting 113 connected to a suitable source of air supply. The device is further provided with a valve member 114 containing two oppositely disposed recessed portions 115 and 116 in registry with passageways 110 and 111 respectively, said recesses forming connecting ports between pipe 112 and the aforesaid passageways. The terminal ends of the valve are pivotally connected to armatures 117 and 118 of solenoids 119 and 120, respectively. Said solenoids are electrically connected to the photo-electric means in the manner clearly shown in Figure 11. The photo-electric device 37 is electrically connected by leads 121 to the relay 122 adapted to actuate its armature 123 against the action of spring 124. When the relay is not excited by the photo-electric cell, the circuit through conductor 125 will be closed, thereby actuating solenoid 120; but when the relay is operatively actuated by the photo-electric device, it will draw the armature 123 to it, to close the circuit through conductor 126, thereby actuating solenoid 119. In this manner the solenoids 119 and 120 are operatively actuated by the photo-electric means, to cause a reciprocating movement of the valve 114. When the valve is in the position shown in Figure 9, the air will pass from pipe 112 through port 116 and passageway 111 into the cylinder to cause a movement of the piston 107 to the right; and when the armature 118 is drawn to the left, it will cause piston 114 to correspondingly move to the left, resulting in a passage of air through port 115, passageway 110, into the cylinder, thereby causing the piston 107 to move to the left. It will further be observed that when air passes into the cylinder through one port 111, the opposite port 110 becomes an outlet passageway for the air on the opposite side of the piston, which air enters the region of recess 127 of the piston and then out into the atmosphere through port 128. From the above it is evident that the oscillating action of the master rod 97 is continuous, and is entirely controlled by the photo-electric device 37.

Figure 18:
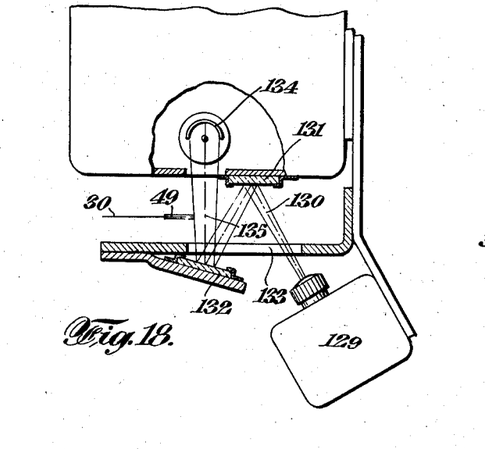
Figure 18 is a semi-diagrammatic sectional plan view taken substantially along line 18—18 of Figure 1, showing the photo-electric arrangement for tracking one edge of the material.

When material 30 is a curtain or some lacy fabric, or some other material containing interstices or having some light-transmitting properties, there is always the danger that sufficient light from the light source of the photo-electric device will penetrate the material to operatively affect the light-sensitive means. To eliminate this condition, I have devised a system where the light beam is reflected by at least two mirrors before reaching the light-sensitive means. By referring to Figure 18, the light source 129 is illustrated as directing a beam of light 130 at the mirror 131 from which it is reflected to mirror 132, and from the latter mirror it is reflected through window 133 to the light-sensitive cell 134. When the line of travel of the material 30 is such that the selvage 49 clears the final reflected beam 135, said beam is obviously completely unobstructed and is capable of directing its full energy upon the cell 134. Under these conditions, the relay 122 (Figure 11) becomes energized, will attract the armature 123 against the action of spring 124 and will accordingly energize solenoid 119, which will tend to move material 30 to the right.

Figure 19:
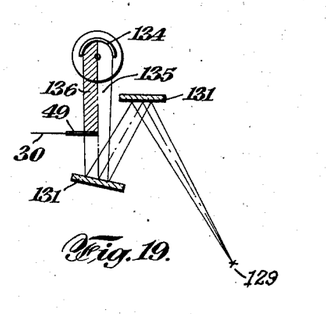
Figure 19 is a diagrammatic view of the light source, photo-electric cell, intervening reflectors, and one edge of the material in a beam-intercepting position.

When the material 30 is moved to the right to partially intercept final beam 135 (Figure 19), only a portion of such beam is directed with full intensity upon cell 134, the relatively heavy selvage 49 casting a shadow 136 upon the cell. The cell preferably selected for use with this invention is of such sensitivity that it will not be actuated by this beam of reduced intensity, and the spring 124 (Figure 11) will accordingly retract armature 123 to close the circuit through solenoid 120, which will tend to move the material 30 to the left.

Figure 20:
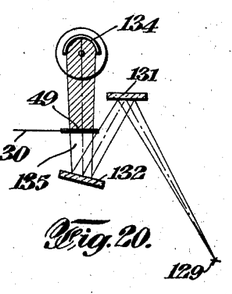
Figures 20, 21 and 22 are views similar to Figure 19, showing three other beam-intercepting positions of the material.

When the material 30 is in the position shown in Figure 20, with the selvage margin completely intercepting the final reflected beam 135, the cell 134 will obviously remain unenergized, to cause an operative movement of material 30 to the left, as above indicated.

Figure 21:
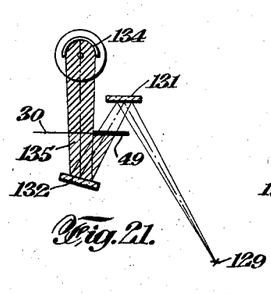

When the material 30 is in the position shown in Figure 21, with the selvage 49 passed beyond the final reflected beam 135, it is apparent that the beam from the light source 129 would have to pass through the said selvage portion after being reflected from mirror 131, and the final reflected beam 135 will again have to pass through the material 30. The beam from the light source is hence intercepted twice during its course of travel to the cell 134, and its intensity is accordingly sufficiently reduced to prevent the cell from being energized—thereby causing the material 30 to be moved to the left, as aforesaid. If the light source, however, had been located at the position of mirror 132, it is apparent that the direct beam of light through a diaphanous material might energize cell 134, thereby preventing the corrective movement of material 30 to the left.

Figure 22:
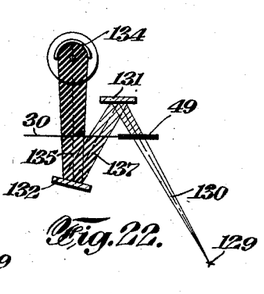
Figure 23:
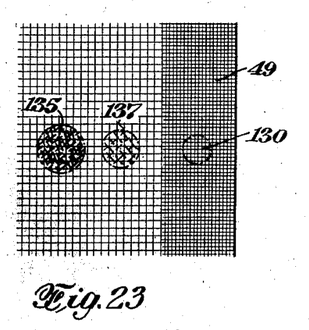
Figure 23 is a diagrammatic front view of curtain material in the position shown in Figure 22, the beams of light passing through the material being diagrammatically represented by circles.

When the material 30 had moved to the right as indicated in Figure 22, the beam 130 from light source 129 will have to penetrate not only the selvage 49, but also the material 30 twice. In other words, the reflected beam of light 137 from mirror 131, after penetrating selvage 49, must penetrate material 30 in order to reach mirror 132, and then must again penetrate material 30 in order to reach cell 134. With the arrangement above illustrated, it has been found that even an exceedingly thin and diaphanous material, with relatively large interstices, will serve to so reduce the intensity of the beam as to render it incapable of actuating cell 134. By referring to Figure 23, it will be seen that the beam of light 130 intercepts the selvage 49 as indicated, the return beam 137 being diagrammatically shown as being of somewhat reduced intensity, and the final reflected beam 135 being shown of still further reduced intensity.

Figure 24:
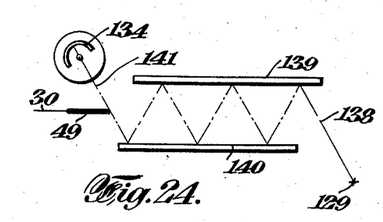
Figure 24 is a diagrammatic view, substantially similar to that of Figure 19, showing a modified arrangement of the photo-electric combination.

The same principle above described can be employed to an extended degree as illustrated in Figure 24. Here the light source 129 directs its initial beam 138 against the relatively long mirror 139, the beam being several times reflected between mirror 139 and oppositely disposed mirror 140 until the final reflected beam 141 is received by the cell 134. It is apparent that this arrangement would be effective with an exceedingly sheer material, inasmuch as the beam of light would be intercepted several times before finally reaching the cell, so that the final beam 141 would be of such reduced intensity as to render it incapable of operatively affecting cell 134.

After the material 30 has passed the photoelectric device 37, it passes over the actuating roller 38, as aforesaid. In rotatable engagement with an end of said roller is the cutter wheel 48 which is so positioned as to be in operative engagement with the inner edge of the selvage margin 49. Inasmuch as the selvage edge of the material had been tracked along a straight path under the influence of the photo-electric device 37, cutter 48 will at all times be in the correct position for cutting off the selvage margin. The said cutter wheel 48 is rotatably mounted upon a bifurcated arm 142 (Figures 1, 2 and 15), said arm being secured to shaft 143 which is rotatably mounted at bearing 144, the outer extremity of said shaft 143 having secured thereto the lever 145 one extremity of which is normally pulled down by spring 146, whereby the cutter wheel 48 is held in yieldable engagement with roller 38. The other extremity of lever 145 is in engagement with the cam lever 148, so that upon a clockwise rotation of said lever 148 by manual manipulation lever 145 is moved in a counterclockwise direction against the action of spring 146, to remove the cutter wheel 48 from engagement with roller 38. In the construction shown (see Figures 1 and 2), the said lever 148, rotatably mounted at 210, contains the hub 211 the underside of which contains the cam portion 212 engageable with the upper surface of lever 145.

The strip of selvage cut from the material 30 by cutter 48 is directed into the mouth 149 (Figure 15) forming the inlet portion of air chute 150. A nozzle 151 extends into said chute 150, and an air supply pipe 152 is joined to said nozzle. When a stream of air is introduced through pipe 152 and nozzle 151 into the chute, it will cause a partial vacuum or depression in the region of mouth 149, causing the cut selvage edge 49 to be drawn into chute 150 and conducted away to any desired region for disposal.

It should be noted that the end portion of roller 38 in engagement with cutter wheel 48 contains no frictional surfacing thereon, but is rather composed of hardened steel adapted to cooperate with the roller for producing the desired cutting effect.

It should be further observed that the roller 38 is adapted to feed the material 30 upwardly regardless of the varying tension or pull exerted by the stitching machine 43 or the rearwardly disposed pulling mechanism. In other words, the material is being guided up to the sewing apparatus, and not being pulled upwardly by the sewing machine or other pulling apparatus. The arrangement is hence such that the feed is uniform along the entire width of roller 38, thereby eliminating the tendency of the sewing machine to create an uneven flow by its operative pull along one edge of the material. The actuating roller 38 thus cooperates with the control drum 36 to effect a suitable tracking of the material.

Figures 14, 16, 17:
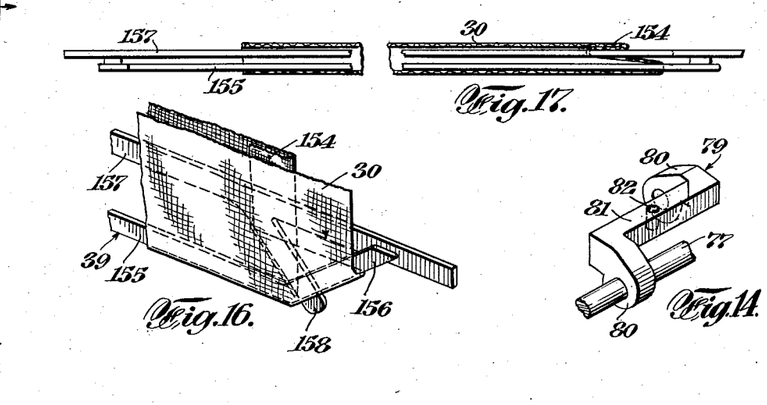
Figure 14 is a fragmentary perspective of a slide member operatively associated with one of the rods constituting part of the control drum.
Figure 16 is a fragmentary perspective of the lowermost folding bars for producing the first step in the hem-folding operation.
Figure 17 is a plan view of the fold-forming device of Figure 16 with the material in operative engagement therewith.

From roller 38, the material is directed downwardly to the first hem-folding device 39, which produces a turned up hem 154 (Figure 16), so that it will be conveniently received and further folded by hem folders 40 and 41. The said first-folding device 39 comprises a longitudinally disposed bar 155 containing at its end an upwardly extending angularly disposed arm 156. Spaced rearwardly from bar 155 and parallel thereto is the longitudinally extending rear bar 157, containing a downwardly extending branch 158 in intersecting relation to arm 156 of bar 155. The material 30 passes downwardly along the front surface of bar 155, the extreme right portion of the material to be hemmed being carried into underlying engagement with arm 156 and then horizontally into underlying engagement with branch 158. As the material is moved upwardly against the rear surface of bar 157, the hem 154 is formed, as clearly shown in Figures 16 and 17. The bar 157 contains at its extreme left end (Figure 1) slotted portion 159 in engagement with bolt means 160 attached to the framework of the machine. The arrangement is such that the hem-folding device 39 can be slidably shifted laterally so as to vary the width of the hem.

After passing hem-folding device 39, the hemmed portion 154 of the material is passed through folders 40 and 41, as aforesaid, which perform further folding operations in conventional manner, to produce a suitably folded hem which is thereafter passed under the presser foot 42 of sewing machine 43 for the stitching operation. From the machine the material is passed into engagement with roller 44, and then upwardly over rollers 45 and 46 from which it is permitted to drop into receptacle 47.

It should be noted that the material has been progressively moved upwardly until it attains its highest level at rollers 45 and 46, which have deliberately been made sufficiently high above receptacle 47 to permit the material 30 to be deposited in neat folds within said receptacle. The action of material 30 from the elevation of roller 46 will be in pendulum fashion, the width of the receptacle being sufficient to accommodate the maximum pendulum amplitude of the material depending from roller 46. It has been found that the material automatically falls into quite regular and even folds within said receptacle.

The motor 61 is directly connected by belting 58 to actuating roller 38 as aforesaid, by belting 161 to the sewing machine 43, and by belting 162 to pulley 163 which is connected through suitable gears (not shown) in gear box 164 to pulley 165. Said latter pulley is directly connected by belting 166 to upper pulley 167, which is connected by shaft 168 to pulley 169. The latter pulley is connected by belting 170 to pulley 44 and by belting 171 to pulley 46. It is thus seen that the said motor 61 actuates the system of rollers 44, 45 and 46, causing a rearward pull of the material from the sewing machine 43.

The motor 61 (Figures 2 and 4) is operatively associated with a clutch mechanism 172 which is actuated by the clutch rod 173 attached to the treadle cut-off device 174, the operation of which will be hereinafter briefly set forth. The clutch plate 175 is operatively held in frictional engagement with clutch plate 176 by the spring 177. The said rod 173 is pivotally attached to the clutch lever 178 preferably integral with the sleeve 179 rotatably mounted over shaft 180. Said sleeve contains an oblique slot 181 in engagement with a pin 182 affixed to the stationary bearing member 183 suitably attached to the framework of the machine. The pulley 59 and collar 184 are affixed to shaft 180, and rotatable therewith. Upon an operative upward movement of rod 173, the lever 178 will be correspondingly moved upwardly to cause the sleeve 179 to rotate in a counter-clockwise direction, whereby the walls of the slot 181 will engage the pin 182, resulting in a retraction or rearward movement of sleeve 179 away from the motor. Inasmuch as the lever 178 is abuttable with collar 184, this outward movement will cause a slight outward movement of the shaft 180, thereby drawing the clutch plate 175 out of engagement with the clutch plate 176. It is thus apparent that an upward movement of rod 173 will cause a disengagement of the clutch, and accordingly operatively disconnect the pulley 59 and actuating roller 38 from the motor 61. When this occurs, the operative movement of material 30 will cease, inasmuch as it is caused to move under the influence of said roller 38.

The cut-off device 174 contains a locking mechanism 185 with a conventional electro-magnetically operable retractable bolt 186 underlying the over-hanging lip 187 of locking lever 188. Should there be a disengagement of bolt 186 and lip 187, the spring 189 anchored at 190 and attached to pivotally mounted lever 191 will urge said lever 191 upwardly in a clockwise direction. The said lever 191 contains a pin 192 in underlying engagement with lever 193 pivotally mounted at 194; and pivotally secured to lever 193 at 195 is rod 173. It is hence apparent that upon a clockwise upward movement of lever 191, the pin 192 will engage the underside of lever 193 and cause it to move upwardly in a clockwise direction, thereby causing the clutch rod 173 to be correspondingly moved upwardly to cause a declutching of the driving mechanism as aforesaid.

Figures 3, 5:
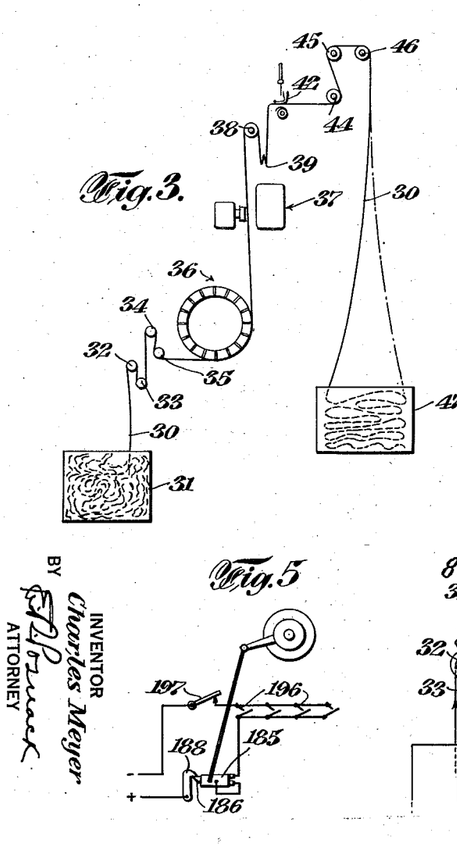
Figure 3 is a schematic side elevation of the invention of Figure 1, analogous to Figure 2, showing the path of the material.
Figure 5 is a schematic wiring diagram of the electrical circuit associated with the cut-off treadle.

As will be seen from Figure 5, the locking mechanism 185, similar to a conventional oscillating door latch, is part of a circuit which may be connected to a number of switches 196 in multiple arrangement. Should any of said switches 196 be closed, when the control switch 197 is also in its closed position, it is evident that the circuit through locking mechanism 185 will be closed, thereby causing a retraction of bolt 186, and in this manner releasing the mechanism as aforesaid to cause a declutching of the motor. Likewise, upon a depression of foot treadle 198, which is in fixed relation to locking lever 188, said locking lever will be rotated in a counter-clockwise direction to release the bolt 186 and operatively cause the transmission mechanism to be declutched, also as aforesaid. The arrangement is hence such as to permit an immediate stoppage of the flow of the material under certain conditions.

It is of course understood that other additional forms of apparatus and adaptations of the method of my invention can be employed beyond and in addition to those hereinbefore described, all within the scope of the appended claims.

What I claim is:

1. In an apparatus for controlling the flow of pliable material along a predetermined path, actuating means adapted for engagement with the material for continuously moving it in the direction of its length, rotary means in the said path of the material, laterally movable friction means on said rotary means disposed on each side of the medial portion of said path and adapted to frictionally engage the material, guiding means to laterally move said friction means on both sides of said medial portion a predetermined amount in opposite directions, and oscillating control means to laterally move said friction means on both sides of said medial portion a predetermined amount in the same direction.

2. In an apparatus for controlling the flow of pliable material along a predetermined path, actuating means adapted for engagement with the material for continuously moving it in the direction of its length, rotary means in the said path of the material, laterally movable friction means on said rotary means disposed on each side of the medial portion of said path and adapted to frictionally engage the material, guiding means to laterally move said friction means on both sides of said medial portion a predetermined amount in opposite directions, oscillating control means to laterally move said friction means on both sides of said medial portion a predetermined amount in the same direction, light-sensitive means along an edge of said predetermined path and adapted for operative association with the adjacent edge of the material, and electro-mechanical means operatively connecting said light-sensitive means and said control means.

3. In an apparatus for hemming curtains or similar material, actuating rollers adapted for engagement with the material for continuously moving it longitudinally along a predetermined path, rotary means in the said path of the material, laterally movable friction means on said rotary means disposed on each side of the medial portion of said path and adapted to frictionally engage the material, guiding means to laterally move said friction means on both sides of said medial portion a predetermined amount in opposite directions whereby the engaged material will be stretched laterally, oscillating, control means to laterally move said friction means on both sides of said medial portion in the same direction, whereby the entire width of the material will be correspondingly moved to bring a lateral edge thereof on a predetermined marginal path, light-sensitive means in the region of said marginal path adapted for operative association with the said lateral edge of the material, electro-mechanical means operatively connecting said light-sensitive means and said control means, selvedge cutting means in the path of said material and at a predetermined distance from said marginal path, and hem-folding and hemstitching means at predetermined positions within the path of the material.

4. In an apparatus for hemming curtains or similar material, actuating rollers adapted for engagement with the material for continuously moving it longitudinally along a predetermined path, rotary means in the said path of the material, laterally movable friction means on said rotary means disposed on each side of the medial portion of said path and adapted to frictionally engage the material, guiding means to laterally move said friction means on sides of said medial portion a predetermined amount in opposite directions whereby the engaged material will be stretched laterally, oscillating, control means to laterally move said friction means on both sides of said medial portion in the same direction, whereby the entire width of the material will be correspondingly moved to bring a lateral edge thereof on a predetermined marginal path, light-sensitive means in the region of said marginal path adapted for operative association with the said lateral edge of the material, electro-mechanical means operatively connecting said light-sensitive means and said control means, one of said rollers being adapted to exert a feeding pull on the material away from said rotary means, said last-mentioned roller containing a hardened cutting portion within the path of said material, and a cutting wheel a predetermined distance from said marginl path and adapted for pressing engagement against said hardened portion for cutting the marginal portion of the material operatively passing therebetween, whereby the material will be provided with a straight lateral edge suitable for hemming.

5. In an apparatus for controlling the flow of pliable material, a rotatably mounted control drum for laterally stretching the material, comprising two adjacent cylindrical banks of slats with a common axis and of equal and uniform diameters, the slats on one bank being in substantial alignment with the corresponding slats on the other bank and all slats being movably mounted in parallel relation to said common axis; guiding cam means pivotally mounted at opposite ends of the drum and extending in diverging directions from said pivotal mountings, the outer ends of each bank of slats being operatively connected with the adjacent cam means, whereby upon an operative rotation of the drum the adjacent aligned slats connected with the most proximate portions of the oppositely disposed cam means will be in relatively close relation the adjacent aligned slats connected with the other more remote portions of the said oppositely disposed cam means will be progressively separated, and adjustable means to maintain said diverging cam means in predetermined angular relation, and oscillating means connected to both of said cam means for simultaneously moving them in the same direction.

6. In an apparatus for controlling the flow of pliable material, a rotatably mounted control drum for laterally stretching the material, comprising two adjacent cylindrical banks of slats with a common axis and of equal and uniform diameters, the slats on one bank being in substantial alignment with the corresponding slats on the other bank and all slats being movably mounted in parallel relation to said common axis; guiding cam means pivotally mounted at opposite ends of the drum and extending in diverging directions from said pivotal mountings, the outer ends of each bank of slats being operatively connected with the adjacent cam means, whereby upon an operative rotation of the drum the adjacent aligned slats connected with the most proximate portions of the oppositely disposed cam means will be in relatively close relation and the adjacent aligned slats connected with the other more remote portions of the said oppositely disposed cam means will be progressively separated, means to maintain said diverging cam means in predetermined angular relation, and oscillating control means for pivotally moving said divergent cam means in the same direction, whereby both banks of slats will be simultaneously shifted in the same direction without affecting the progressive separation of the adjacent aligned slats.

7. In an apparatus for controlling the flow of pliable material, a rotatably mounted control drum for laterally stretching the material, comprising two adjacent cylindrical banks of slats with a common axis and of equal and uniform diameters, the slats on one bank being in substantial alignment with the corresponding slats on the other bank and all slats being movably mounted in parallel relation to said common axis; rotatably mounted divergent disks at opposite ends of the drum, radially movable members disposed about the periphery of each disk and pivotally connected to the outer ends of the slats on the adjacent bank, whereby upon an operative rotation of the drum the adjacent aligned slats connected with the said radially movable members on the most proximate portions of the oppositely disposed disks will be in relatively close relation and the adjacent aligned slats connected with the said members on the more remote portions of the disks will be progressively separated.

8. In an apparatus for controlling the flow of pliable material, a rotatably mounted control drum for laterally stretching the material, comprising two adjacent cylindrical banks of slats with a common axis and of equal and uniform diameters, the slats on one bank being in substantial alignment with the corresponding slats on the other bank and all slats being movably mounted in parallel relation to said common axis; rotatably mounted divergent disks at opposite ends of the drum, radially movable members disposed about the periphery of each disk and pivotally connected to the outer ends of the slats on the adjacent bank, whereby upon an operative rotation of the drum the adjacent aligned slats connected with the said radially movable members on the most proximate portions of the oppositely disposed disks will be in relatively close relation and the adjacent aligned slats connected with the said members on the more remote portions of the disks will be progressively separated, pivotal mountings for said disks, a connecting member between said disks for maintaining them in predetermined angular relation, and control means operatively associated with said disks for pivotally moving them a predetermined amount in the same direction, whereby both banks of slats will be simultaneously shifted in the same direction without affecting the progressive separation of the adjacent aligned slats.

9. In an apparatus for controlling the flow of pliable material, a rotatably mounted control drum for laterally stretching the material, comprising a cylindrical cage of rods extending parallel to the axis of the drum, a plurality of slide members each being slidably mounted on two adjacent rods; rotatably mounted divergent disks at opposite ends of the drum, radially movable members disposed about the periphery of each disk and pivotally connected to the outer ends of the slats on the adjacent bank, whereby upon an operative rotation of the drum the adjacent aligned slats connected with the said radially movable members on the most proximate portions of the oppositely disposed disks will be in relatively close relation and the adjacent aligned slats connected with the said members on the more remote portions of the disks will be progressively separated, pivotal mountings for said disks, and oscillating means connected to both of said disks for simultaneously moving them in the same direction.

10. In an apparatus for controlling the flow of pliable material, a rotatably mounted control drum for laterally stretching the material, comprising a cylindrical cage of rods extending parallel to the axis of the drum, a plurality of slide members each being slidably mounted on two adjacent rods; rotatably mounted divergent disks at opposite ends of the drum, radially movable members disposed about the periphery of each disk and pivotally connected to the outer ends of the slats on the adjacent bank, whereby upon an operative rotation of the drum the adjacent aligned slats connected with the said radially movable members on the most proximate portions of the oppositely disposed disks will be in relatively close relation and the adjacent aligned slats connected with the said members on the more remote portions of the disks will be progressively separated, pivotal mountings for said disks, a connecting member between said disks for maintaining them in predetermined angular relation, and reciprocating control means operatively associated with said disks for pivotally moving them a predetermined amount in the same direction, whereby both banks of slats will be simultaneously shifted in the same direction, without affecting the progressive separation of the adjacent aligned slats.

11. In an apapratus for controlling the flow of pliable material, a rotatably mounted control drum for laterally stretching the material, comprising two adjacent cylindrical banks of slats with a common axis and of equal and uniform diameters, the slats on one bank being in substantial alignment with the corresponding slats on the other bank and all slats being movably mounted in parallel relation to said common axis; guiding cam means pivotally mounted at opposite ends of the drum and extending in diverging directions from said pivotal mountings, the outer ends of each bank of slats being operatively connected with the adjacent cam means, whereby upon an operative rotation of the drum the adjacent aligned slats connected with the most proximate portions of the oppositely disposed cam means will be in relatively close relation and the adjacent aligned slats connected with the other more remote portions of the said oppositely disposed cam means will be progressively separated, a connecting member between said diverging cam means for maintaining them in predetermined angular relation, a reciprocating rod operatively associated with said cam means for pivotally moving them a predetermined amount in the same direction, actuating means for said reciprocating rod, photo-electric means in the path of said material and adapted for operative coaction with an edge thereof, and electro-magnetic means operatively connecting said photo-electric means and said actuating means.

12. In an apparatus for controlling the flow of pliable material, the combination according to claim 11, the actuating means for the reciprocating rod comprising a cylinder, a reciprocating piston therein operatively connected to said rod, conduits for a motive fluid communicating with both ends of the cylinder, reciprocating valve means operatively associated with said conduits, and solenoid means connected to said valve means and operatively associated with said photo-electric means.

CHARLES MEYER.